United States Patent [19]
Burge et al.

[11] 3,907,335
[45] Sept. 23, 1975

[54] TUBE COUPLING

[75] Inventors: Donald G. Burge, Plainwell; Norris J. McPhillips, Otsego, both of Mich.

[73] Assignee: Parker-Hannifin Corporation, Cleveland, Ohio

[22] Filed: June 3, 1974

[21] Appl. No.: 475,507

[52] U.S. Cl. ............... 285/23; 285/27; 285/249; 285/382.7
[51] Int. Cl.² ......................................... F16L 33/20
[58] Field of Search .......... 285/249, 248, 250, 259, 285/258, 257, 256, 245, 242, 244, 23, 321, 174, 382.7, 246, 247, 254, 255, 243, 27, 252, 253

[56] References Cited
UNITED STATES PATENTS

| | | | |
|---|---|---|---|
| 2,410,600 | 11/1946 | Cowles | 285/259 X |
| 2,513,115 | 6/1950 | Sprigg | 285/249 |
| 2,793,057 | 5/1957 | McGugin | 285/242 X |
| 3,414,299 | 12/1968 | Roe | 285/321 X |
| 3,591,208 | 7/1971 | Nicolaus | 285/250 |
| 3,830,531 | 8/1974 | Burge | 285/249 X |

FOREIGN PATENTS OR APPLICATIONS

| | | | |
|---|---|---|---|
| 1,068,069 | 10/1959 | Germany | 285/248 |
| 1,496,737 | 8/1967 | France | 285/249 |

*Primary Examiner*—Thomas F. Callaghan
*Attorney, Agent, or Firm*—Donnelly, Maky, Renner & Otto

[57] ABSTRACT

A coupling for elastomeric tube wherein a body and nut having screw-threaded engagement with each other are operative to radially contract a tube embracing sleeve into gripping engagement with the tube while the tube is supported by a nipple therewithin, said coupling being characterized in that the tube supporting nipple is axially retained in the body during shipment, storage, and handling and is radially movable to coaxial position with respect to the tube receiving bores of said body, and sleeve, and nut or to compensate for eccentricity between the outside and inside diameters of the tube. The coupling herein is further characterized in that, after the sleeve has been contracted to grip the tube against the nipple, subsequent unscrewing of the nut and axial withdrawal of the tube will axially withdraw therewith the contracted sleeve and the nipple.

10 Claims, 2 Drawing Figures

US Patent   Sept. 23,1975   3,907,335

TUBE COUPLING

BACKGROUND OF THE INVENTION

In the coupling of flexible tubing it is known to provide a tube supporting nipple in the tube end portion (e.g. Samiran U.S. Pat. No. 3,008,736, Stecher U.S. Pat. No. 2,321,260, and Friedman U.S. Pat. No. 2,460,741), to provide a tube supporting nipple which is integral with the coupling body (e.g. Couty U.S. Pat. No. 2,152,537, Parker U.S. Pat. No. 2,300,464, and Cowles U.S. Pat. No. 2,365,747), to provide a tube supporting nipple which is a separate part permanently secured to the coupling body (e.g. Santhoff U.S. Pat. No. 2,328,298 and Hertel U.S. Pat. No. 3,493,250), and to provide a tube supporting nipple which is retained in the coupling body during shipment, handling, and storage but which is axially withdrawable from the coupling body together with the surrounding tube and radially contracted tube embracing sleeve upon unscrewing of the nut from the body (e.g. Schmidt U.S. Pat. No. 3,685,860).

SUMMARY OF THE INVENTION

In contradistinction to known tube couplings for flexible tubing, the tube coupling herein is characterized in that the tube supporting nipple is securely axially retained in the coupling body during shipment, handling, and storage, is capable of radial adjustment in the coupling body during makeup of the tube coupling joint, and is axially releasable from the coupling body together with the tube and contracted sleeve therearound upon unscrewing of the nut from the body and upon application of axial withdrawal force on the tube.

Other objects and advantages of the present invention will appear in the ensuing description.

DETAIL DESCRIPTION OF A PREFERRED EMBODIMENT

Figure 1:
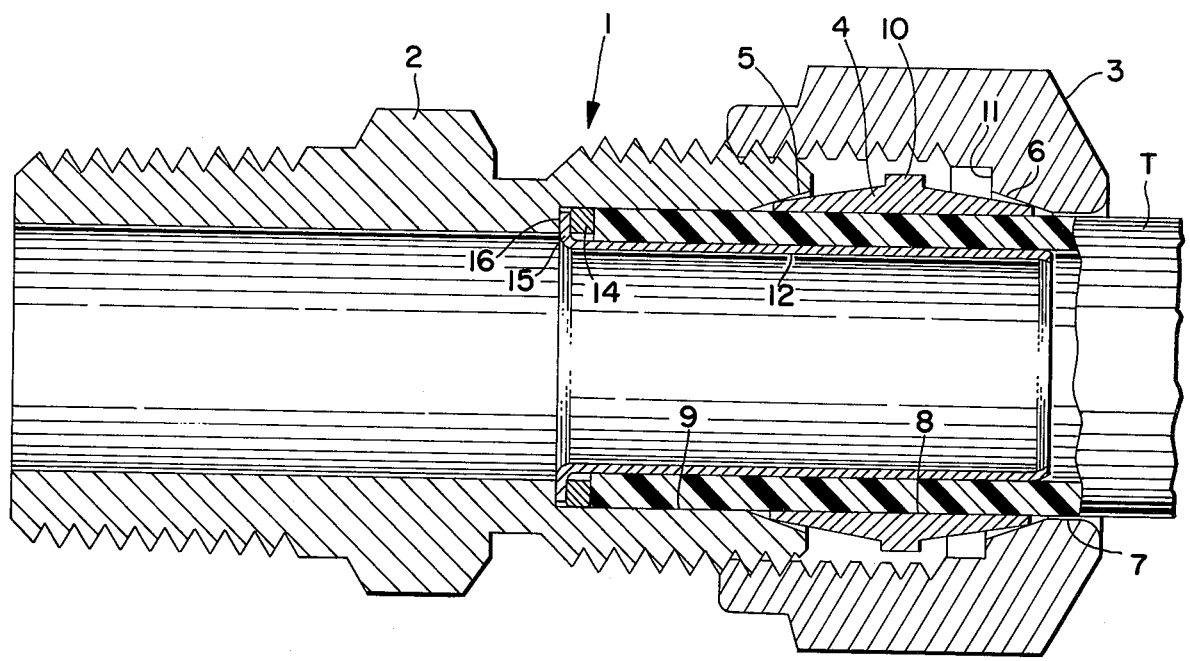
FIG. 1 is a longitudinal cross-section view of a tube coupling assembly according to the present invention, the coupling parts being shown in finger-tight condition.

The present tube coupling assembly 1 comprises body and nut members 2 and 3 screwed together to effect contraction of the end portions of a sleeve 4 which embraces the tube T of elastomeric material such as nylon, the ends of said sleeve 4 being engaged with the oppositely tapered cam surfaces 5 and 6 of the respective body and nut members 2 and 3. Said nut 3, sleeve 4, and body 2 have tube receiving bores 7, 8, and 9 of substantially the same diameter approximately equal to the outside diameter of the tube T. Preferably, the end portions of the sleeve 4 are tapered at smaller angles (9° for example) than the respective cam surfaces 5 and 6 (20° for example) and between the ends of said sleeve 4 is a peripheral rib 10 having its axially outer side engageable with the nut shoulder 11 to limit the degree of compression of the axially outer end portion of the sleeve 4. The nut 3, sleeve 4, and body 2 construction is such that the degree of compression of the axially outer end portion of the sleeve 4 is limited by engagement of the rib 10 with the nut shoulder 11, and the screwing together of the nut 3 and body 2 effects contraction of the axially outer and inner ends of the sleeve 4 where they engage the nut and body cam surfaces 6 and 5 to effect an axial crowding action on the tube T to take up any initial clearance between the tube receiving bore 9 of the body 2 and the outside diameter of the tube T. The engagement of the sleeve 4 with the body cam surface 5 establishes a fluid tight seal therewith.

To support the tube T against radial inward deformation when the sleeve 4 is contracted as aforesaid is a tube supporting nipple 12 which in the case of brass body and nut members 2 and 3 may be made of stainless steel or like strong metal to enable the use of a thin nipple 12 to provide a relatively large flow passage so as not to materially restrict the flow of fluid through the tube coupling assembly 1, the axially outer end of the nipple 12 being curled inwardly as shown to facilitate initial assembly of the tube T over the nipple 12.

In order to facilitate shipment, storage, and handling, the body 2 has securely axially retained therein the nipple 12 by means of the ring 14 which is an interference fit in the tube receiving bore 9 and which engages the radially outwardly extending flange 15 of the nipple 12 between said ring 14 and the shoulder 16 at the axially inner end of the tube receiving bore 9. As shown, the outside diameter of the flange 15 is slightly less than the diameter of the tube receiving bore 9 in said body 2 and there is a radial clearance between the inside diameter of the ring 14 and the outside diameter of the nipple 12. By reason of the flange 15—bore 9 clearance, the flange 15 may be clamped between shoulder 16 and ring 14 with the nipple 12 located coaxially within bore 9 despite slight eccentricity of the periphery of the flange 15 with respect to the outside diameter of the nipple 12.

In the case of brass body and nut members 2 and 3, the ring 14 may be, for example, SAE CA 360 F.C. brass annealed to Rb18–23 and in the case of a nylon tube T of one-half inch outside diameter the ring 14 may be of 0.042 inch thickness with 0.005 to 0.010 inch radii at the radially outer corners and of diameter larger than the diameter of the tube receiving bore 9 in the body 2 to provide for firm retaining of the nipple 12 in the body 2 when the ring 14 is pressed into the bore 9 to engage the flange 15 between the shoulder 16 and the ring 14. In said example, the diameter of the flange 15 may be between 0.495 and 0.505 inch and the outside diameter of the retaining ring 14 may be between 0.515 and 0.518 inch while the tube receiving bore 9 may be of diameter from 0.507 to 0.511 inch and the diameter of the nipple 12 may be between 0.368 and 0.372 inch while the inside diameter of the retaining ring 14 is between 0.388 to 0.397 inch. In the case of a stainless steel nipple 12, the wall thickness need only be from 0.0175 to 0.0195 inch to provide adequate support against noticeable radial inward deformation of the nipple 12 when the sleeve 4 is contracted as in FIG. 2 to grip the tube T against the nipple 12. The rounded or beveled outer corner at the axially inner end of the ring 14, not only facilitates axial insertion of the ring 14 into body bore 9 against flange 15, but additionally reduces the possibility of the embedding of the harder flange 15 of stainless steel, for example, into the softer ring 14 of annealed brass, for example, and consequent deformation of the peripheral portion of the ring 14 into the flange 15-bore 9 clearance in the event of application of extreme axial pressure on said ring when engaged with the flange 15. Such deformation could interfere with the subsequent radial displacement of the nipple 12 by a tube T having an eccentric inside diameter.

Figure 2:
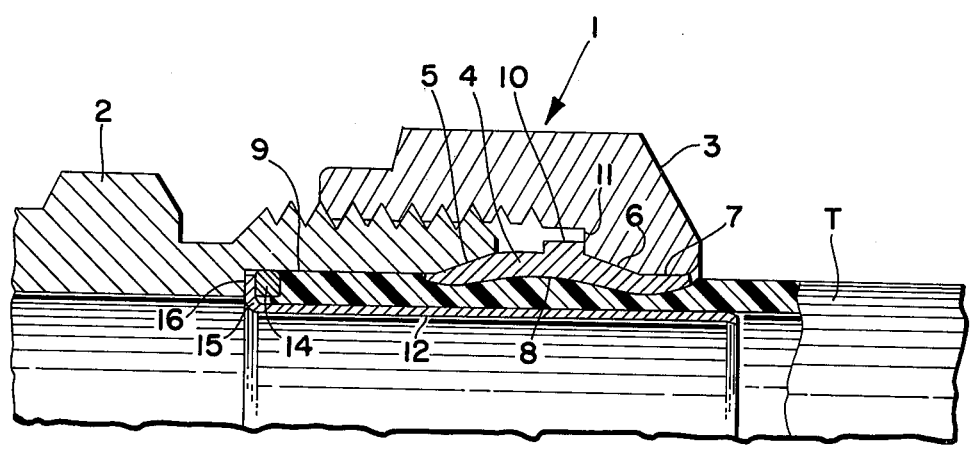
FIG. 2 is a fragmentary cross-section view showing the coupling parts in tightened condition with the tube embracing sleeve in contracted condition to make sealed engagement with the body and to tightly grip and to seal the flexible tube between said sleeve and the tube supporting nipple.

With an interference fit such as indicated it is no problem to press the ring 14 into place as shown in FIGS. 1 and 2 as by a tubular tool (not shown) thus to firmly secure the nipple 12 in the body for shipment, storage, and handling so that the nipple 12 and body 2 constitutes a single unit. However, once the coupling assembly 1 has been assembled as shown in FIG. 2 the loosening of the nut 3 will permit axial withdrawal of the tube assembly comprising the tube T, the contracted sleeve 4, the nipple 12, and the retaining ring 14 with respect to the body 2 and, upon reassembly, the tube T, sleeve 4, nipple 12, and retainer ring 14, unit may be readily pushed into the bore 9 of the body 2. Upon rescrewing of the nut 3 on the body 2, the joint is remade to provide a strong grip on the tube T and a leakproof connection of the tube T to the tube coupling assembly 1.

Should it be desired to remove the nipple 12 from the body 2 before assembly of the tube T thereto, this can be done by applying axial force on a rod or tube which engages the axially inner side of the nipple flange 15 or by applying a lateral tilting force on the axially outer end portion of the nipple 12. With an interference fit of the character indicated, the nipple 12 is firmly held in the body 2 so as in effect to be an integral part thereof during shipment, handling, and storage but, once the tube coupling connection has been made up, the unscrewing of the nut 3 enables withdrawal of the tube T, sleeve 4, retainer 14 and nipple 12 unit by modest axial force on the tube T and reassembly with a snug fit of the ring 14 in bore 9 is equally easy apparently due to the compression of the retaining ring 14 beyond the proportional elastic limit during initial assembly so that repeated disassembly and assembly is more readily accomplished than the initial pressfitting of the ring 14 into place in the tube receiving bore 9 of the body 2. By reason of the initial clearances between the flange 15 and the tube receiving bore 9 and between the inside diameter of the retaining ring 14 and the outside diameter of the nipple 12, the latter is capable of radial movement upon assembly with a tube T to position the nipple 12 coaxially within the respective tube receiving bores 9, 8, and 7 of the body 2, sleeve 4, and nut 3. If there is any eccentricity between the inside and outside diameters of the tube T, the nipple 12 can move radially to accommodate such discrepancy or variation in the wall thickness of the tube T.

From the foregoing it can be seen that in the present tube coupling assembly 1, the nipple 12 is retained in the body 2 so as in effect to be an integral part thereof, but such nipple 12, upon assembly with the nut 3, sleeve 4, and tube T renders the nipple 12 automatically radially adjustable, and when the coupling assembly 1 is disassembled, the nipple 12 and retainer ring 14 together with the tube T and contracted sleeve 4 is axially releasable from the body 2 for repeated makeups.

In the foregoing description it was indicated that the body 2, sleeve 4, and nut 3 bores 7, 8, and 9 form a tube receiving bore of approximately the same diameter as the tube T. It will be appreciated that for ease of assembly it is preferred to have a small clearance between said tube T and said tube receiving bores 7, 8, and 9. Thus, for one-half inch tube T the body bore 9, the sleeve bore 8, and the nut bore 7 may be between 0.507 and 0.511 inch. Furthermore, said nut bore 7 may terminate in a small radius as shown.

Another feature of the present tube coupling 1 is that the initial radial clearance between the nipple 12 and the ring 14 is greater than the radial clearance between the flange 15 and body bore 9 so that when the ring 14 is radially contracted and axially compressed upon press fitting thereof into the body bore 9 into engagement with flange 15 adequate radial clearance remains between the nipple 12 and ring 14 to accommodate radial adjustment of the former with respect to the body bore 9 and to the contracted inside diameter of said ring 14.

The embodiments of the invention in which an exclusive property or privilege is claimed are defined as follows:

1. A tube coupling comprising a body and nipple assembly including a body having a tube receiving bore which at its axially inner end has a radially inwardly extending shoulder, a tube supporting nipple radially spaced within said body bore and extending axially outwardly therebeyond and having a radially outwardly extending flange at its axially inner end which has radial clearance with said body bore, and a retaining ring having an interference fit in said body bore and axially positioned in said body bore to frictionally grip said flange between said shoulder and the axially inner end of said ring to axially retain said nipple in said body in coaxial relation to said body bore during shipment, handling, and storage of said assembly, said ring having an inside diameter which provides a radial clearance around said nipple adjacent to said flange; a sleeve having a tube receiving bore of substantially the same diameter as said body bore which surrounds the portion of said nipple which extends axially outwardly beyond said body bore; a nut having threaded engagement with said body and having a radially inwardly extending annular surface which is engageable with the axially outer end portion of said sleeve; a deformable tube having its end portion inserted through said nut and sleeve into the annular space between said sleeve and body bores and said nipple with its axially inner end in abutting engagement with the axially outer end of said retaining ring; said nipple being radially movable in said body by radial sliding of said flange between said shoulder and said retaining ring to accommodate eccentricity between the outside and inside diameters of said tube; one of said body and nut and said sleeve having cooperating cam surfaces effective, upon screwing together of said body and nut, to radially contract an end portion of said sleeve to grip said tube against the portion of said tube supporting nipple which is within the contracted portion of said sleeve; said tube, nipple, retaining ring, and contracted sleeve being axially withdrawable as a unit from said body bore upon unscrewing of said nut from said body.

2. The tube coupling of claim 1 wherein the interference fit between said retaining ring and said body bore is such as to stress said ring beyond its proportional elastic limit thus to facilitate re-insertion of said nipple, ring, sleeve, and tube as a unit into said body bore.

3. The tube coupling of claim 1 wherein said body and the axially inner end portion of said sleeve have said cooperating cam surfaces effective to radially contract said axially inner end portion of said sleeve to grip said tube as aforesaid against the nipple portion therewithin as said sleeve is axially moved toward said body by engagement with said nut thus to axially crowd said tube against said ring and to deform the tube material against said body bore and said nipple in a region axially inward of the axially inner end of said sleeve.

4. The tube coupling of claim 1 wherein the other of said body and nut and said sleeve have cooperating cam surfaces effective upon screwing together of said body and nut to radially contract the other end portion of said sleeve to grip said tube against the portion of said nipple which is within said other end portion of said sleeve.

5. The tube coupling of claim 4 wherein said sleeve has a peripheral rib between its ends engaged by a shoulder in said nut following radial contraction of the axially outer end portion of said sleeve effective to positively advance said sleeve axially toward said body to effect further radial contraction of the axially inner end portion of said sleeve and to axially crowd said tube against said ring and to deform the tube material against said body bore and said nipple in a region axially inward of the axially inner end of said sleeve.

6. The tube coupling of claim 1 wherein said ring has a beveled radially outer corner to facilitate initial entry thereof into said body bore; and wherein said nipple and ring are metallic, the nipple being harder than said ring whereby said beveled corner reduces the possibility of the peripheral portion of said ring being deformed into the radial clearance between said flange and said body bore by application of extreme axial pressure on said ring when engaged with said flange.

7. A tube coupling body and nipple assembly comprising a body having at one end a tube receiving bore which has a radially inwardly extending shoulder at the axially inner end of said bore and an outwardly flaring cam surface at the axially outer end of said bore; a nipple extending axially outwardly through said bore in radially spaced relation thereto and having a radially outwardly extending flange at its axially inner end adjacent to said shoulder; and a retaining ring having an interference fit in said bore and axially positioned in said bore to frictionally grip said flange between said shoulder and the axially inner end of said ring thus to axially retain said nipple in said body in coaxial relation to said body bore; said flange having radial clearance with said bore to permit coaxial positioning of said nipple in the event of slight eccentricity of the periphery of said flange with respect to said nipple; and said nipple having radial clearance with the inside diameter of said ring to permit in conjunction with the first mentioned clearance, radial movement of said nipple in said body by forceful radial sliding of said flange between said shoulder and said inner end of said ring.

8. The assembly of claim 7 wherein said ring has a beveled radially outer corner to facilitate initial axial insertion of said ring into said body bore to a position engaging said flange; and wherein said nipple and ring are metallic, the nipple being harder than said ring whereby said beveled corner reduces the possibility of the peripheral portion of said ring being deformed into the radial clearance between said flange and said body bore by application of extreme axial pressure on said ring when engaged with said flange.

9. The assembly of claim 7 wherein said ring has an initial inside diameter larger than the diameter of said nipple by an amount sufficient to provide said radial clearance therebetween in the radially contracted condition of said ring due to the interference fit and to the axial compression of said ring into frictional engagement with said flange.

10. The assembly of claim 7 wherein the interference fit between said retaining ring and said body bore is such as to stress said ring beyond its proportional elastic limit to facilitate re-insertion of said nipple and ring following axial withdrawal of said nipple and ring from said body bore.

* * * * *